United States Patent [19]

Collier

[11] 4,027,770

[45] June 7, 1977

[54] CONVEYOR CHAIN ASSEMBLIES HAVING SCRAPER BARS ATTACHED AT INTERVALS TO A CHAIN OR CHAINS

[75] Inventor: Paul Arthur Collier, Rock, near Kidderminster, England

[73] Assignee: Rellico Engineering Limited, Rock near Kidderminster, England

[22] Filed: Aug. 13, 1975

[21] Appl. No.: 604,269

[30] Foreign Application Priority Data

Sept. 2, 1974 United Kingdom ............ 38273/74

[52] U.S. Cl. .................................. 198/728; 198/733
[51] Int. Cl.[2] ......................................... B65G 19/00
[58] Field of Search .......... 198/175, 176, 189, 168, 198/733, 728

[56] References Cited

UNITED STATES PATENTS

| 529,016 | 11/1894 | Bennett | 198/176 |
| 659,348 | 10/1900 | Mercer | 198/176 X |
| 3,653,492 | 4/1972 | Temme | 198/175 |
| R18,445 | 4/1932 | Redler | 198/168 |

FOREIGN PATENTS OR APPLICATIONS 1,091,760  11/1967  United Kingdom ............ 198/176

*Primary Examiner*—Johnny D. Cherry
*Assistant Examiner*—Douglas D. Watts

[57] ABSTRACT

A conveyor chain assembly with upper and lower chain runs separated by a deck has scraper bars each attached to the outer two links of a three link chain run. The outer links can rotate relative to the center link to allow the chain to negotiate a sprocket. Each scraper bar is formed with two frame members pinned together to form closed slots which house the outer links. The attachment may be duplicated to connect a bar to two parallel chains if required.

6 Claims, 6 Drawing Figures

CONVEYOR CHAIN ASSEMBLIES HAVING SCRAPER BARS ATTACHED AT INTERVALS TO A CHAIN OR CHAINS

This invention relates to conveyor chain assemblies having scraper bars attached at intervals on a chain or chains. Such assemblies are used particularly in mining although they have other materials handling applications. One or more endless chains travel along upper and lower runs separated by a deck. The scraper bars on the upper run travel on or close to the deck, and convey material there-along to a discharge point from a loading point. Such assemblies need to be very robust as breakdowns particularly in mines are expensive in terms of lost output.

The invention also relates to scraper bars for such assemblies.

One problem presently encountered with such conveyor chain assemblies and scraper bars involves attachment of the scraper bars to the chains in a strong and sufficiently rigid manner. The attachment can be placed under very severe loading, and therefore needs to be strong, but nevertheless has to be able to negotiate a driving sprocket where reversal of direction of movement of the chain occurs. Existing assemblies usually have scraper bars respectively fastened to single links of the chain, or of each chain where two or more are provided, the single link being secured within the bar by means of a strap or stirrup. Due to the limited space available in and around the chain links, together with the need to negotiate the sprocket, it is difficult to obtain sufficient strength.

Another problem with known conveyors is the wear on the centre of the conveyor deck due to the chain bearing down upon it. This is particularly the case when a single central chain is used. In addition, the scraper bars tend to be unstable in use where a single chain is used, due to the limited restraint against oscillation which is provided by a single link to which the bar is attached. Such oscillation involves rotational movement in the plane of the chain and may be caused by uneven loading on either side of the chain. The longer the scraper bar, the more acute oscillation may be. Oscillation also occurs when the chain is slack, which may be the case near drive sprockets, and when the assembly is passed round a tight curve where friction or resistance at the ends of the bars may be high.

Due to the relatively small space available in the vicinity of the chain, and due to the need to pass around sprockets, the dimensions of the scraper bars in the vicinity of the chain are limited, so that the scraper bars are not as strong as may be desired. They are therefore susceptible to breakage not only from loads applied by resistance in the conveying direction but also by vertical loads, perpendicular to the conveying direction, which may be encountered where the level of the conveyor alters, for instance at a deflection on approach to a driving sprocket. When vertical loads are applied to the bars by the chain centrally of the bars, the reaction points are the outer ends of the bars where these are guided in side members of the conveyor. Large bending moments may therefore be applied to the bars in the vicinity of the chain and the resulting susceptibility to breakage is a serious limitation on the length of the scraper bars and thus the width of the conveyor which can be used.

In an effort to reduce these difficulties, the present invention provides an assembly where the scraper bars are each attached to two links in a three link length of chain.

According to the present invention, therefore, there is provided a conveyor chain assembly including at least one chain in upper and lower runs separated by a deck, and scraper bars attached at intervals to the chain, each bar being connected to the outer two links of a three link length of chain, and allowing articulation of the outer links relative to the bar to allow the chain to pass round a sprocket.

The links used for attachment are preferably 'horizontal' links, that is links lying generally parallel to the deck of the conveyor, but they may be 'vertical' links. In the case of horizontal links, the attachment may be by means of the two horizontal links concerned being clamped between a main frame of the scraper bar and an upper frame part remote from the deck which is bolted to the main frame. Where vertical links are used for the attachment alternative clamping arrangements can be used.

This arrangement provides a stronger attachment than has been hitherto available, chiefly because the scraper bar utilises the space around two links rather than one, and uses a top closing medium to spread stresses through the structure.

Obviously the assembly must be able to negotiate a drive sprocket, and this is achieved by the feature of the chain being allowed to articulate within the bar as it passes round the sprocket. It is preferred for this to be achieved by reason of the frame members being so shaped that the two clamped links, that is the outer two links of the three link run to which the bar is attached, can pivot in the frame about an axis perpendicular to the chain travelling direction. On such pivoting, the central link rides upwards, away from the sprocket, within the bar.

The invention is particularly applicable to single strand conveyors, having a single chain which may be at the middle of the conveyor, or at the edge. The invention can also be applied to two strand conveyors, the scraper bars each being attached to two parallel chains which may run at the edges of the conveyor or inward thereof.

The invention also provides a scraper bar for a conveyor chain assembly including means to attach the bar to the outer two links of a three link length of chain, and to allow articulation of the outer links relative to the bar.

With the invention, as the area of fastening together of the frame members of the scraper bars is away from the chain, the fastening can be stronger because it is not limited to size by the chain and sprocket. The scraper bar can be formed with front and rear arms in the main frame member, the arms being spaced apart and being stronger but lighter than in many known scraper bars. Accordingly, wider conveyors can be made due to the increased strength. With the two arm arrangement, the spacing between the front and rear arms of the main frame member allows the scraper bar to have bracing webs inserted to resist frontal loading without an excessive increase in weight.

An advantage of the preferred two arm arrangement is the greater rubbing surface of the scraper bar which is in contact with the conveyor deck. The surface is spread over a greater distance along the line of the chain and thus reduces wear on the deck plate. The outer ends of the scraper bars will also have a larger length of contact with the side members of the conveyor, which normally provide guiding action, so that lower wear occurs here also.

A further advantage of the invention is that as the scraper bars are clamped to two spaced links of the chain, the chain provides a greater controlling effect on a tendency of the bar to oscillate during use. The pull in the chain provides a controlling moment to tend to bring the scraper bar at right angles to the chain if it encounters forces tending to rotate it. Accordingly, less oscillation of the bars occurs, for instance, when negotiating curves which involve the conveyor turning through a right angle or more where friction or resistance at the ends of the bars can give rise to high turning movements. This controlling action of the chain, tending to maintain the bars in the correct orientation, is also apparent when the chain is slack, because if the arm oscillates, this will tend to tighten the chain and thus cause an increase in the correcting moment applied by the chain.

In order that the invention may be more clearly understood, the following description is given, merely by way of example, with reference to the accompanying drawings in which.

Figure 1:
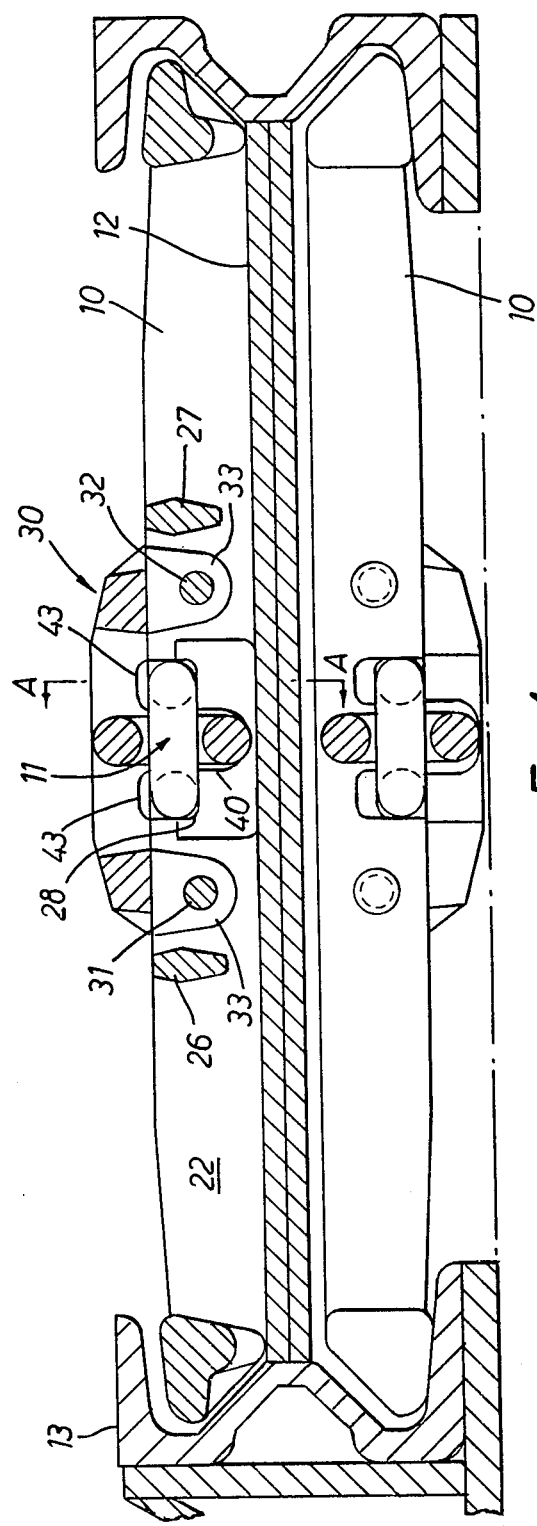
FIG. 1 is a transverse section through a conveyor according to invention, a scraper bar being shown in section in the upper part of the Figure and in side view in the lower part.
Figure 3:
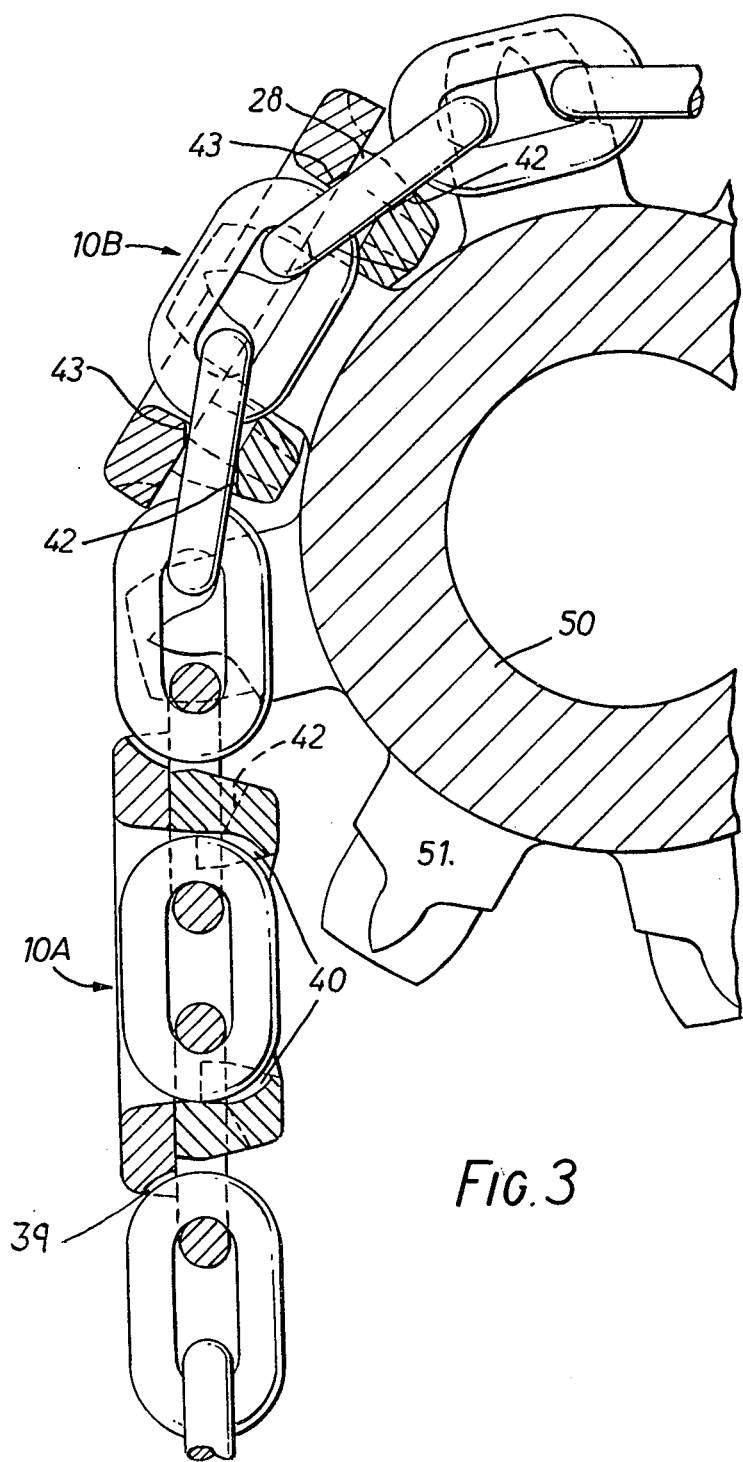
Figure 4:
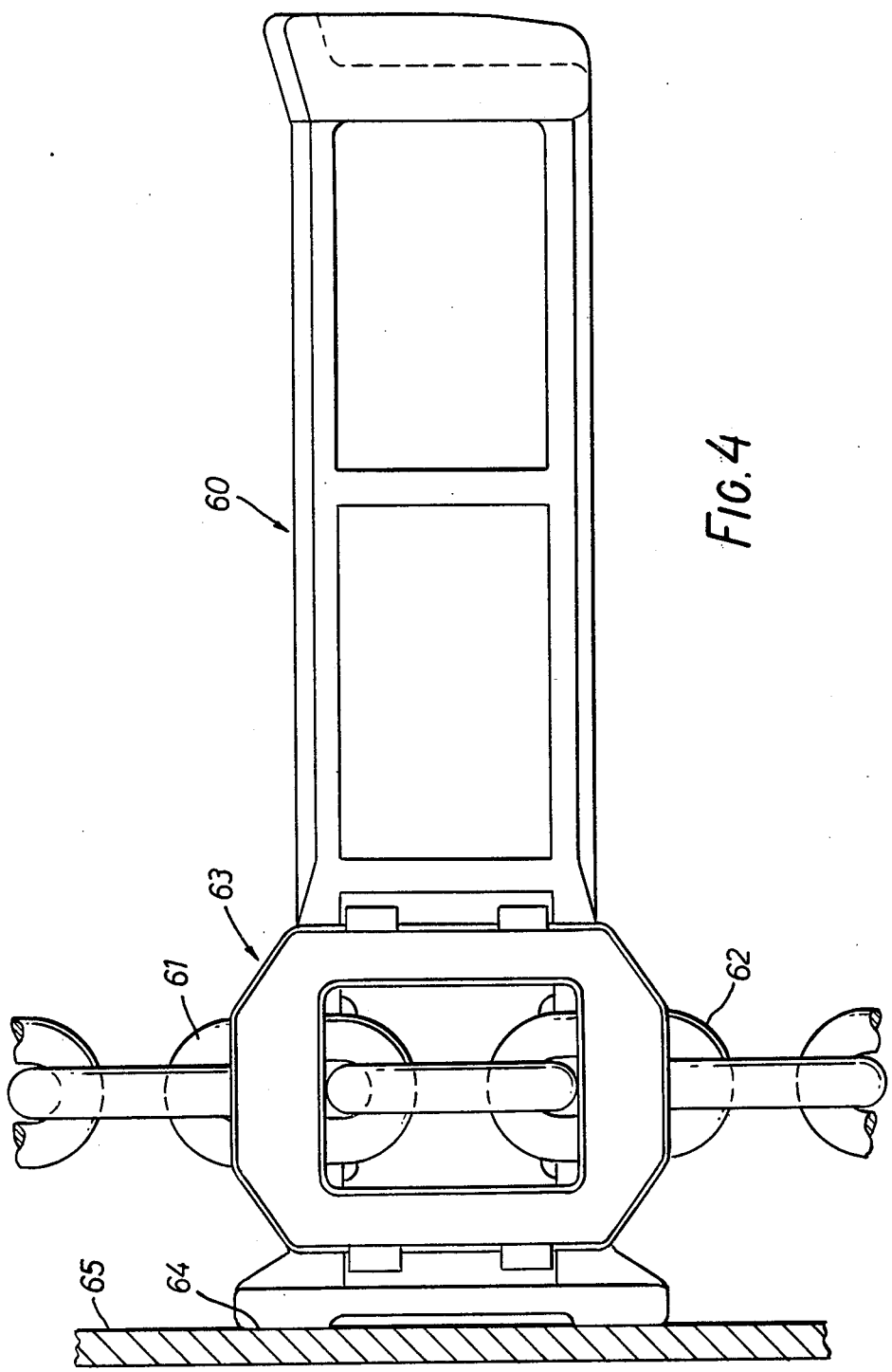
Figure 5:
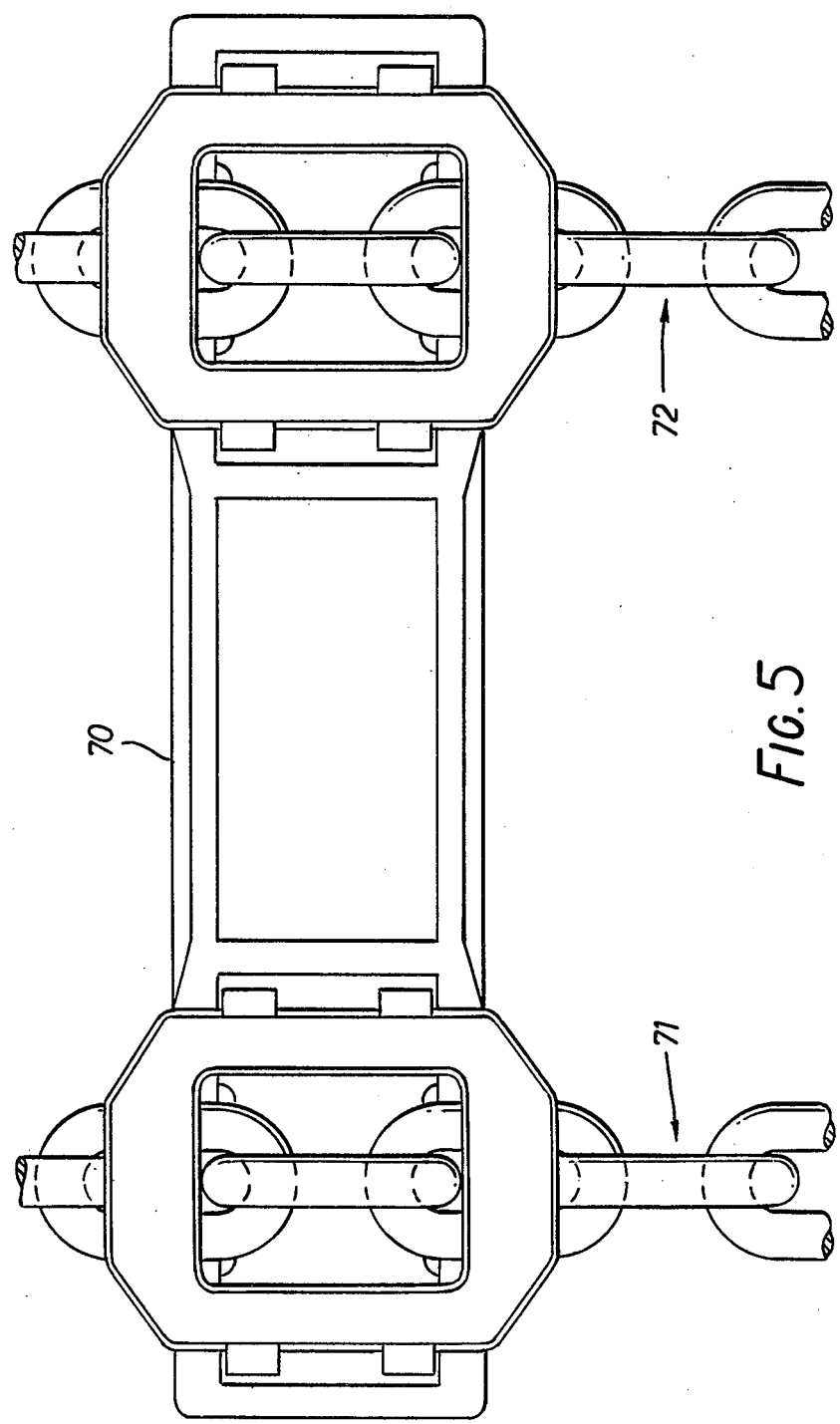
Figure 6:
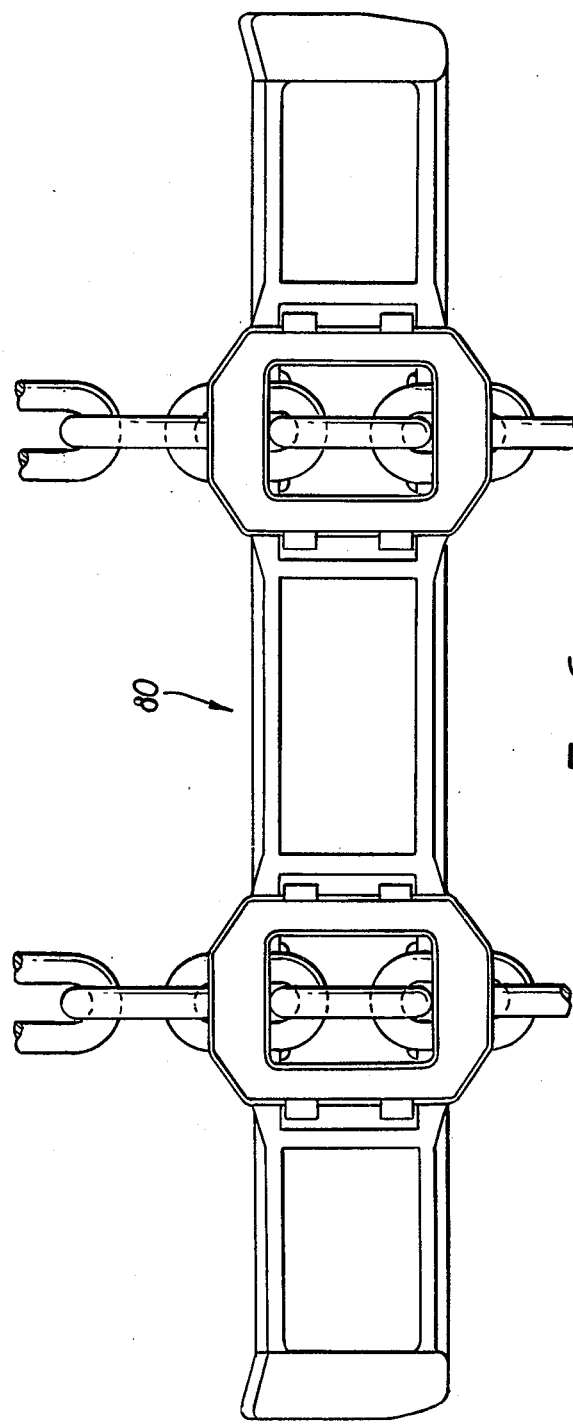

FIG. 3 includes sectional views of two scraper bars on a chain, with a first bar, shown as a section on the line A—A of FIG. 1, negotiating a sprocket, and a second bar in section on its center line approaching the sprocket;

FIG. 4 illustrates an application of the invention where a single side chain is used;

FIG. 5 illustrates an application of the invention where two side chains are used at the edges of the scraper bars;

FIG. 6 shows an application of the invention where two chains are used inboard of the edges of the scraper bars.

Figure 2:
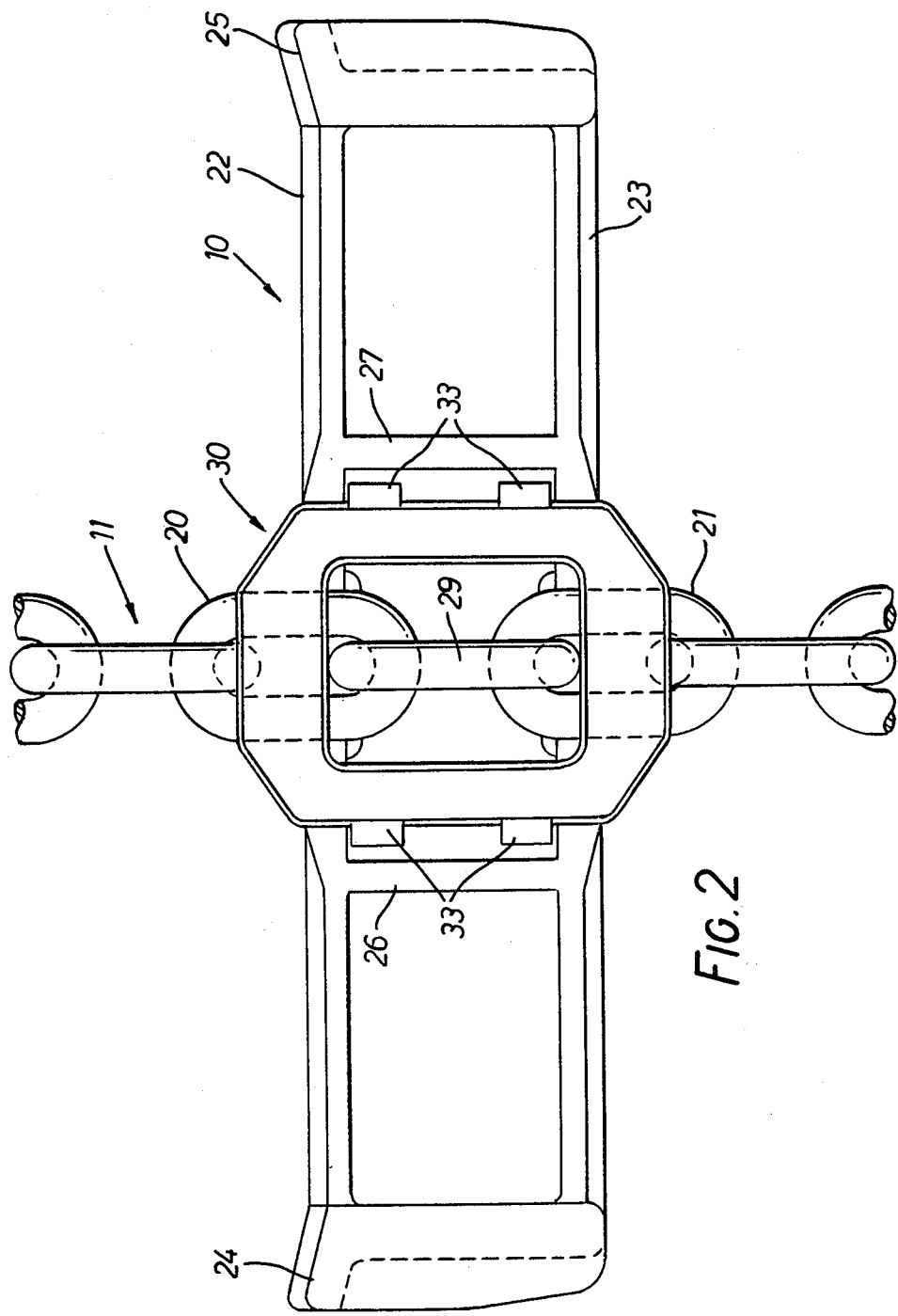
FIG. 2 is a view from above of the scraper bar and chain shown in the upper part of FIG. 1.

In the embodiment of FIGS. 1, 2 and 3 a chain conveyor includes scraper bars 10 pulled by an endless central chain 11. The chain and bars pass in the conveying direction above a deck 12, and return beneath the deck. The ends of the bars are guided by side members 13 joined to the deck.

FIG. 2 shows the attachment of one scraper bar 10 to successive 'horizontal' links, 20, 21 of the chain these links lying parallel to the deck 12, and being joined by a vertical link 29. The scraper bar includes a main frame member comprising two arms 22, 23 extending transversely of the chain direction. These arms are connected at their ends by end members 24, 25 shaped to run in grooves in the side members 13. The arms 22, 23 are also connected by bracing cross pieces, 26, 27 nearer to the chain. The arms 22, 23 are cut away, as seen in the upper part of FIG. 1 at their upper sides in a central position as shown at 28 to receive the links 20, 21. Normally, the tops of the links are flush with the upper edges of the arms. The vertical link 29 is located between the arms, and an upper frame member generally indicated at 30, and of generally rectangular shape is placed above the links, 20, 21 and is attached to the main frame member of the scraper bar by means of pins 31, 32 each of which pass through two of four legs 33 of the upper frame member. The upper frame member overhangs the next vertical links outside the three link run to which the arm is attached, and is slotted as shown in FIG. 3 at 39 for this purpose.

It will thus be seen that each scraper bar is clamped to two successive horizontal links, with the intermediate vertical link being located between two arms of the main frame member of the scraper bar.

A feature of the invention is the manner in which the scraper bar, when attached to the chain, can still be passed round sprockets. This is achieved by means of the way in which the attachment is formed.

With the reference to FIG. 3, a first scraper bar 10A is approaching a sprocket 30, and a second scraper bar 10B is engaged with the sprocket. The links of the chain associated with bar 10B are in a different position relative to the bar from the normal position in straight travel of the chain, as represented in connection with bar 10A. In particular, the vertical link which is within the bar has been raised, by the teeth of the sprocket beyond the upper face of the upper frame part of the scraper bar. The two horizontal links are engaged by shoulders of teeth of the sprocket within the scraper bar and have been pivoted to cause this raising of the central vertical link. This pivoting of the horizontal links and the raising of the central vertical links provides the freedom of movement necessary for the chain links and scraper bar to pass round the sprocket.

The central vertical link can be simply raised as may be seen from FIGS. 1 and 2, due to the fact that the upper frame member 30 surrounds this link but does not make contact with it. The arms 22, 23 of the main frame member are slotted at 40 as shown in FIGS. 1 and 3 to provide spaces in which the lower part of the curved ends of the central vertical link can lie when the chain is straight. The horizontal links are pivotable due to the fact that the outer ends of the channels 28 in the arms 22, 23 of the main frame member are inclined downwardly as shown at 42 in FIG. 3. Equally, the inner edges of the upper frame member 30 immediately above the channels 28 are chamfered as shown at 43. Thus, as may be clearly seen from FIG. 3, although the horizontal links are clamped between the upper frame member and the main frame member of the scraper bars, they are also free to pivot to a limited extent such that their ends within the bars can rise up and be engaged by a double toothed sprocket, and the central vertical link is also free to rise.

The sprocket 50 is shown in FIG. 3 in central sectional view, and has pairs of teeth as shown at 51. The teeth of each pair are spaced a sufficient distance apart to receive between them the vertical links, and they extend on each side of the vertical links, within the space in the middle of the scraper bar, to engage the ends of the horizontal links. By reason of the construction of the scraper bars there is plenty of room around the chain for the teeth to operate on the links.

It will be seen with reference to FIG. 3 that the central vertical link is used for transmitting force to the scraper bar by reason of the fact that it abuts the main frame member when the chain is straight and the upper frame member when the chain is curved around the sprocket. Thus, the vertical link transmits the force, while the horizontal links are supported and controlled as to position by the frame members, although they can articulate when the chain is curved.

FIG. 4 shows an embodiment wherein a single chain is used which runs at the side of the conveyor and has the scraper bar extending to one side only. The scraper bar which is indicated at 60 is similar to that previously described except that it extends only to one side. The connection of the scraper bar to successive horizontal links 61 and 62 of the chain is as described, the upper frame member 30 co-operating with the main part of the scraper bar in exactly the same way. At its left end as shown, the scraper bar has a running surface 64 to engage a plane guiding face 65 of the conveyor. While this embodiment provides the same advantages as to strength, control of rotation of the scraper bar and ability to pass around sprockets as have been described above, it is particularly applicable where part of the conveyor may also be curved in the plane of the drawing.

FIG. 5 shows a further variation wherein a scraper bar 70 is attached to two parallel chains 71 and 72. The attachment of the scraper bar to each of these chains is the same as has been described above, and similar advantages accrue. The same is true of FIG. 6, which differs only in that the two chains are located at equal distances inwards from the outer ends of the scraper bar 80, whereas in FIG. 5 they are located at the ends of the bar 70. Again, in FIG. 6, the attachment of the scraper bar to the two chains is the same as has been described with reference to the preceding drawings.

I claim:

1. A conveyor chain assembly comprising, in combination, at least one endless chain in upper and lower runs, scraper bars attached at intervals along said chain, and a deck separating said upper and lower runs, each said bar having attachment means associated with a three link length of said chain to attach said bar to said chain, said three link length comprising two outer links and an intermediate link, said attachment means embracing said outer links and allowing articulation of said outer links relative to said bar whereby said chain may pass round a sprocket, wherein the planes of said outer two links are parallel to said deck, and further comprising a main frame part and an upper frame part to each scraper bar, said parts being secured together with said outer links restrained therebetween, and further comprising slots defined in said main frame part at a side thereof remote from said deck, said outer links being received in said slots and restrained therein by said upper frame part, and wherein said slots increase in depth towards the sides of said main frame part in the direction of said chain whereby to allow said articulation.

2. An assembly as claimed in claim 1 including a space in said attachment means accommodating said intermediate link, said intermediate link being a close fit in said space in the direction of said chain.

3. An assembly as claimed in claim 1 wherein said upper frame part is slotted at inner edges thereof to allow said articulation.

4. An assembly as claimed in claim 1 wherein each said bar comprises front and rear spaced apart arms extending transversely of said chain.

5. An assembly as claimed in claim 1 including a single chain.

6. An assembly as claimed in claim 1 including two chains each engaging each bar at positions equally spaced from the centers of the bars.

* * * * *

UNITED STATES PATENT AND TRADEMARK OFFICE
CERTIFICATE OF CORRECTION

PATENT NO. : 4,027,770
DATED : June 7, 1977
INVENTOR(S) : Paul Arthur Collier

It is certified that error appears in the above-identified patent and that said Letters Patent are hereby corrected as shown below:

Assignee "Rellico Engineering Limited" should be deleted and --Reilloc Engineering Limited-- should be inserted.

Signed and Sealed this

Thirteenth Day of December 1977

[SEAL]

Attest:

RUTH C. MASON
Attesting Officer

LUTRELLE F. PARKER
Acting Commissioner of Patents and Trademarks